J. J. WOJCIK.
GRAIN MEASURING AND SACK FILLING DEVICE.
APPLICATION FILED OCT. 8, 1917.
1,313,149.
Patented Aug. 12, 1919.
3 SHEETS—SHEET 1.
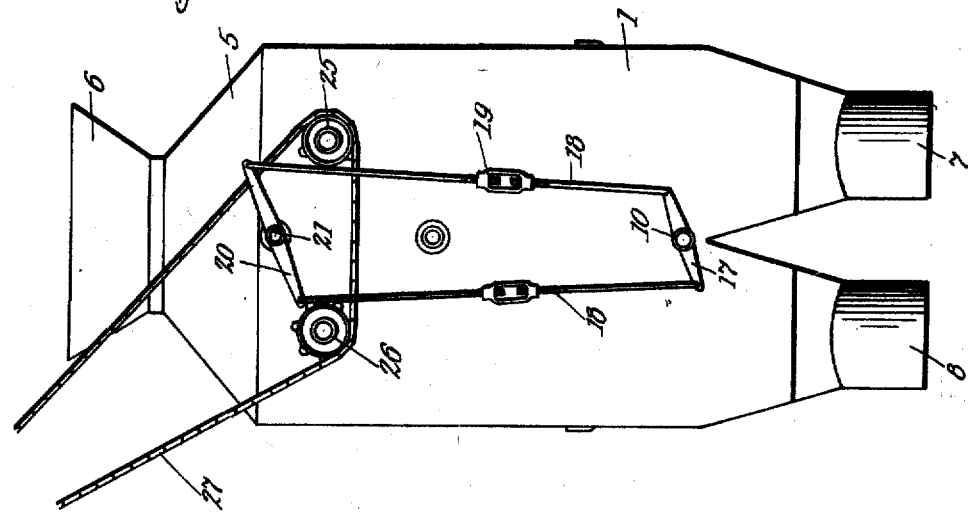
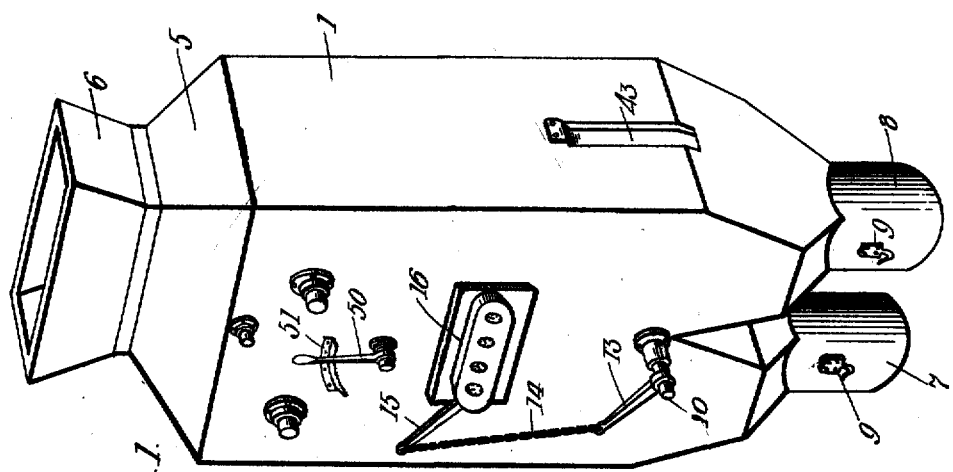
Jos. J. Wojcik - Inventor.
By
E. F. Bond
his atty.

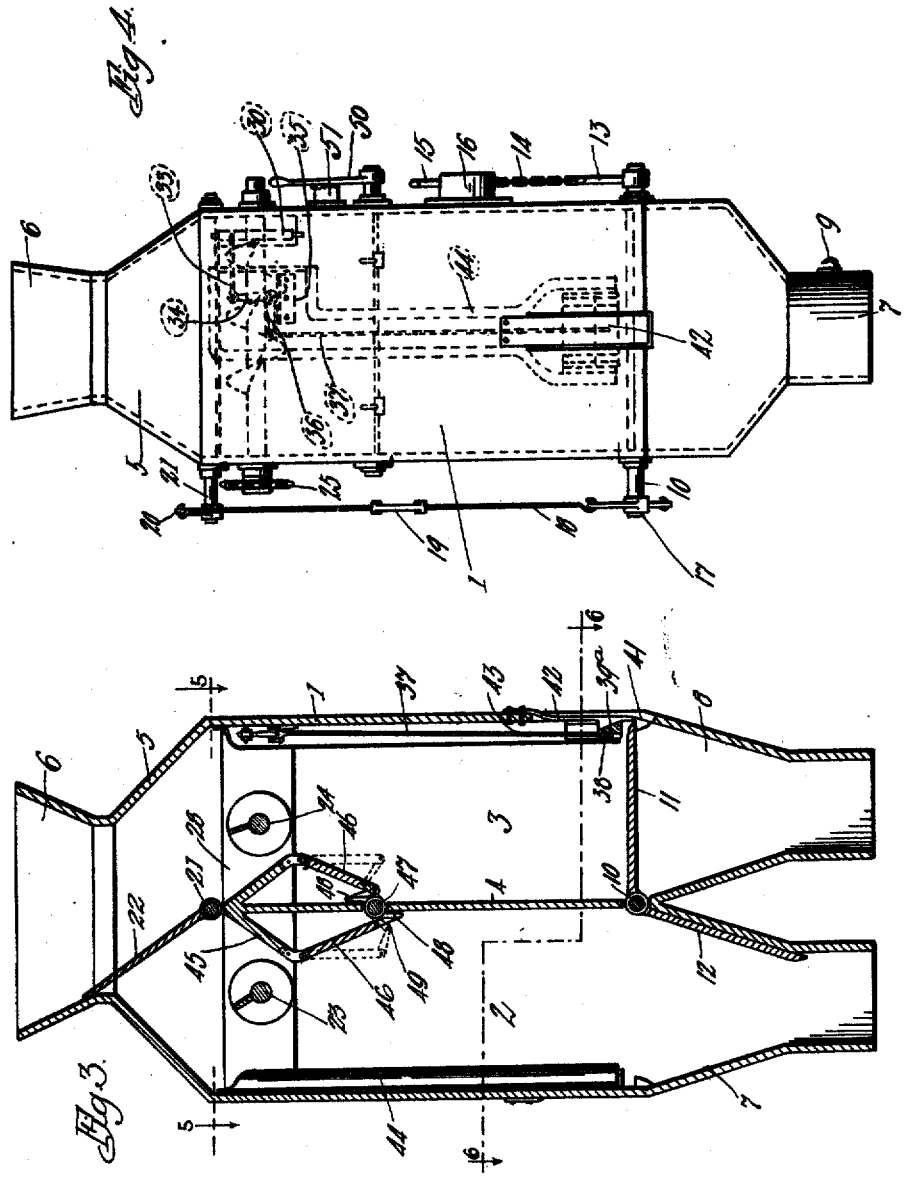

J. J. WOJCIK.
GRAIN MEASURING AND SACK FILLING DEVICE.
APPLICATION FILED OCT. 8, 1917.

1,313,149.

Patented Aug. 12, 1919.
3 SHEETS—SHEET 3.

Jos. J. Wojcik — Inventor

By E. Fozond
his Atty.

UNITED STATES PATENT OFFICE.

JOSEPH J. WOJCIK, OF PULASKI, WISCONSIN.

GRAIN-MEASURING AND SACK-FILLING DEVICE.

1,313,149.   Specification of Letters Patent.   Patented Aug. 12, 1919.

Application filed October 8, 1917. Serial No. 195,350.

*To all whom it may concern:*

Be it known that I, JOSEPH J. WOJCIK, a citizen of the United States of America, residing at Pulaski, in the county of Brown and State of Wisconsin, have invented certain new and useful Improvements in Grain-Measuring and Sack-Filling Devices, of which the following is a specification, reference being had therein to the accompanying drawing.

The invention relates to a device for measuring a predetermined quantity of grain or other material and for registering the number of quantities measured.

The principal object of the invention consists in providing a device of the character described, preferably used in connection with a thresher or separator which permits rapid and continuous measuring of the grain or other cereal issued from the separator or the like.

A further object of the invention consists in providing a device of the character described which is entirely automatic in operation, so that no attendance is necessary in order to obtain the necessary and desired measuring of the quantity of material passing through the device.

It is also an object of the invention to provide a device with a plurality of measuring chambers which are used alternatively such that continuous measuring is provided by filling one chamber while the other chamber containing a measured quantity of material is being emptied.

A further object constitutes the arrangement of automatic means for closing and opening the various measuring chambers, which means are brought into play by the material.

A further object of the invention constitutes the provision of measuring chambers which are opened or closed only after the material has reached a certain height, thus insuring a predetermined cubical quantity prior to actuation of the opening and closing means of said chambers.

It is also an object of the invention to provide means in said measuring chambers whereby their capacity may be varied within certain limits, so that, in accordance with the material to be used, larger or lesser quantities may be measured.

To the accomplishment of the objects stated and others which will become apparent as the description proceeds, the invention is predicated on the means described in the appended specification, particularly pointed out in the annexed claims, and illustrated in the accompanying drawings, in which—

Figure 1 is a perspective view of the device, constituting one embodiment of the invention;

Fig. 2 is a rear view of the device.

Fig. 3 is a longitudinal section of the device;

Fig. 4 is a side view thereof;

Figure 5:
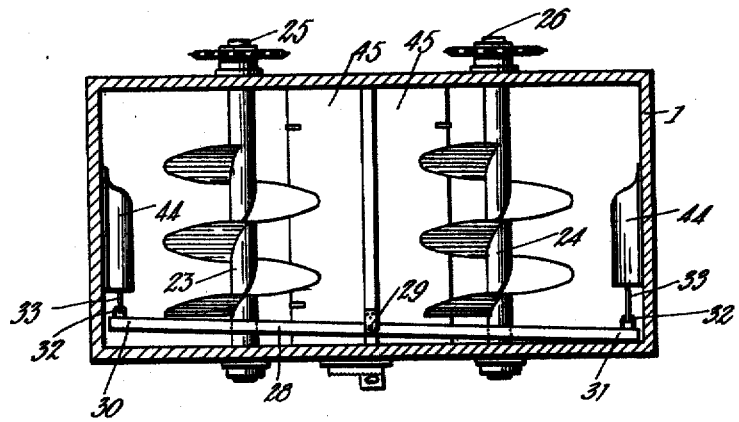
Fig. 5 is a section, to an enlarged scale, on line 5—5 of Fig. 3.
Figure 6:
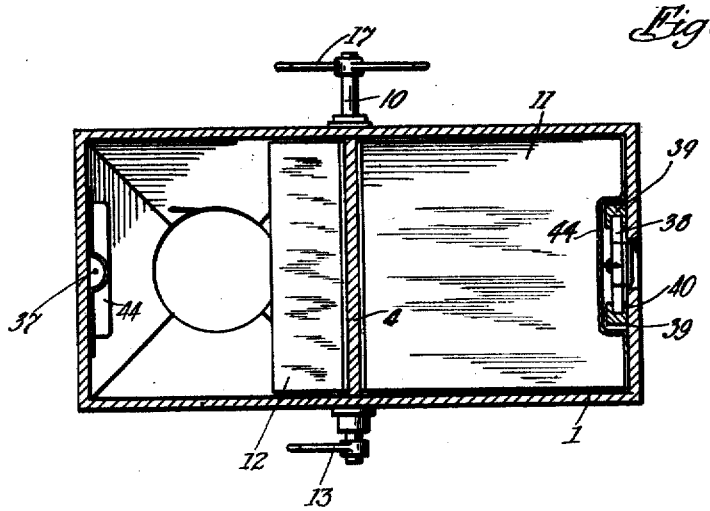
Fig. 6 is a section, to an enlarged scale, on line 6—6 of Fig. 3.

Referring to the drawing, 1 designates the casing containing a plurality of chambers 2 and 3, formed by a vertical partition wall 4, which extends transversely and centrally of the casing 1, the measuring compartments or chambers 2, 3 when filled containing a certain predetermined amount of material. At the upper end the casing 1 is formed with a conical portion 5, which terminates in a hopper 6, through which the material emanating from the thresher or separator is conducted to the measuring chambers 2 and 3 in a manner hereinafter further described. The lower portion of the casing 1 is provided with a plurality of spouts 7, 8, which communicate with the respective chamber 2 or 3, and which terminate at their lower end in round tubes for the purpose of forming supports for sacks or bags to be filled.

To facilitate filling of the bags, hooks 9 are secured to the tubes, as indicated in Fig. 1. A shaft 10 extends through the casing 1 in transverse direction where the inner walls of the spouts 7 and 8 meet, and to this shaft plates 11 and 12 are securely fastened, which form bottoms or closures for the compartments 2 and 3 respectively. As will be seen by reference to Fig. 3, the bottom plates 11 and 12 are arranged with respect to one another to form an obtuse angle such that when the plate 11 is in closing position plate 12 contacts with the inner wall of the spout 7, whereby the material in compartment 2 is discharged without meeting any obstructions. At the front side of the device the shaft 10 is equipped with a lever 13, connected by a flexible member, such as a chain 14, to an arm 15 of a registering device 16, whereby the number of oscillations of the shaft 10, and accordingly the number of times in which measurements of the passing material have been made, is readily recorded.

At the rear end of the shaft 10 a lever 17 is keyed thereto, and a plurality of rods 18, provided with turn buckles 19, connect the ends of the lever 17 with a similar lever 20, keyed intermediate its ends to a shaft 21, also extending transversely of the device and parallel to the shaft 10. From the foregoing it is obvious that oscillation or rocking of the shaft 10 is simultaneously imparted to the shaft 21, which is equipped with a deflector plate 22, controlling the communication between the hopper 6 and the chambers 2, 3 and thereby diverting the material from the hopper selectively to said chambers. In the position shown in Fig. 3 the deflector plate 22 opens the compartment 3 to the hopper 6 and the plate 11 forms a closure for said compartment, so that the material is gradually collected in said compartment until the latter becomes filled with it. In the position of the parts opposite to that shown in Fig. 3, the deflector 22 is oscillated to contact with the right side of the hopper 6, and simultaneously the plate 12 is brought into horizontal position while the plate 11 points downwardly, so that material is conducted from the hopper 6 to the compartment 2 and gathers itself on the bottom 12 until the compartment is filled therewith. The compartment 3, upon downward movement of the plate 11, is then being emptied.

At the upper end of the compartments, screw conveyers 23 and 24 are provided, extending in transverse direction and projecting at the rear end beyond the casing 1 to carry sprocket wheels 25 and 26 respectively, around which a flexible member, such as a chain 27, is trained. The latter encompasses at the upper end a similar sprocket wheel (not shown), provided on the elevator shaft of the thresher or on any other shaft to which a drive is imparted.

In a vertical position in front of the conveyers 23 and 24, a board 28 is arranged, in proximity to the front wall of the casing 1 and extending longitudinally thereof, as indicated in Fig. 5. The board is pivoted at its longitudinal center, as indicated at 29 (Fig. 5), and is provided with apertures of sufficient dimension to permit passage of the shafts of the screw conveyers 23, 24, allowance being made for the pivotal movement of the board 28 for a purpose presently to be described. The ends of the board 28, designated by 30 and 31, are each provided with a staple 32, to which one end of a horizontal rod 33 is secured, the other end being articulated with a bell crank lever 34, pivotally secured on an angular plate 35, which is fastened to the adjacent side wall of the casing 1. The horizontal member 36 of the bell crank lever 34 is pivotally secured to a vertical rod 37, which is fastened with its lower end to a plate 38, capable of executing a reciprocable movement in vertical direction, and guided in such movement by guide members 39, which form ways 40 for the sliding plate 38. The sliding plate 38 is equipped at its lower portion with a projection 39$^a$, having an inclined face and adapted to engage a correspondingly inclined face of a hook 41 at the lower end of a spring bar 42, which is secured to the outside of the side wall of the casing 1 and extends through an opening 43 in said side wall. A casing 44 covers the sliding plate 38, the guide members 39, the rod 37, and the bell crank lever 34, so that the material passing through the compartments will not interfere with the operation of these parts.

The central partition 4 of the casing 1 is provided at its upper end with slantingly arranged boards 45, which extend in close proximity to the screw conveyers 23, 24 and transversely of the casing 1. The purpose of these slanting boards 45 is to confine the material close to the screw conveyers when a certain level has been reached. Hingedly connected to boards 45 are boards 46, also extending the full width of the casing 1. A shaft 47 is arranged to extend transversely of the casing. The shaft 47 is provided with a plurality of arms 48, extending in opposite directions, the free ends of said arms being connected by members 49 to the boards 46. The shaft 47 projects through the front wall of the casing 1 to carry a lever 50 fast thereto and engaging a quadrant 51, which holds the lever in any desired position by frictional contact. As may be seen from the dotted line shown in Fig. 3, the boards 46 may be adjusted in any position between the positions shown in solid and dotted lines, whereby the capacity of the compartments 2 and 3 may be varied within certain limits.

The operation of the device is as follows:

The grain or other material issued from the thresher, separator, or other device falls into the hopper 6 in the position shown in Fig. 3, and then into the compartment 3, where it collects until it reaches a level with the lower edge of the board 28. Subsequent entry of material into said compartment will cause the material to be engaged by the screw conveyer 24, which thus is forced against the end of the board 28, whereby the latter is swung about its pivot 29. This horizontal movement of the board 28 causes an oscillation of the bell crank lever 34, and the ensuing lifting of the sliding plate 38 causes the projection 39$^a$ thereof to act on a correspondingly shaped portion of the hook 41, which is forced outwardly against the tension of its spring bar 42 and thus releases the bottom plate 11. The latter, under the weight of the material accumulated thereon, is forced downwardly and comes into contact with the inner wall of the spout 8. This movement of the plate 11 entails an upward movement of the plate 12, which is thus brought into horizontal position, in which it is locked by the spring action of the hook 41. The movement of the plates 11, 12, however, is simultaneously communicated to the shaft 21, which places the deflector plate 22 in the position opposite to that shown in Fig. 3. The compartment 2 is then arranged to receive the incoming material, while the compartment 3 is being emptied into the bag attached to the spout 8.

The device is automatic and continuous in operation, and requires no attendance other than the removal of filled bags and the attachment of empty ones. As has been stated, the screw conveyers 23, 24 are continuously driven from the shaft of the thresher or from any other shaft which is kept in constant rotation.

While the drawing shows the preferred embodiment of the invention, many changes may suggest themselves to those versed in the art, and I therefore do not limit myself to the exact details as shown, but claim my invention as broadly as the state of the art will permit.

I claim:

1. In a device of the character described, a plurality of measuring chambers having inlet and outlet passages, pivotally mounted plates adapted to alternatively and simultaneously close and open the outlet passages of said chambers, a deflector controlling the inlet passages of both chambers, said deflector being coupled with said plates, locks for securing said plates in different positions, means for releasing said locks, and conveyers forcing the material against said lock releasing means.

2. In a device of the character described, a measuring chamber having an inlet and outlet passage, a bottom adapted to alternately open and close said outlet passage, a catch adapted to maintain said bottom in closing position, an arm pivotally mounted in said chamber, a catch controlling plate, means for interconnecting said arm and said controlling plate, and a conveyer forcing the material against said arm to release said bottom.

3. In a device of the character described, a plurality of measuring chambers having inlet and outlet passages, plates adapted to alternately open and close said outlet passages, catches adapted to maintain said plates in different positions, an arm pivotally mounted in said chamber, plates adapted to control said catches, means for interconnecting said arm and said controlling plates, and conveyers forcing the material against said arm to release said catch controlling plates.

4. In a device of the character described, a plurality of measuring chambers having inlet and outlet passages, plates adapted to alternately open and close said outlet passages, a deflector controlling the inlet passages of both chambers, means for coupling said plates with said deflector to synchronize their movement, catches adapted to maintain said plates in different positions, an arm pivotally mounted on said chamber at a certain level, plates adapted to control said catches, means for interconnecting said arm and said catch controlling plates, and conveyers arranged to force the material thereagainst to release the plates from their catches, substantially as described.

5. A grain measuring and registering device, comprising in combination a plurality of measuring chambers, a hopper communicating with the upper end of said chambers, spouts forming the lower ends of said chamber, plates for alternatively interrupting and establishing communication between said chambers and the spouts, a deflector selectively establishing communication between said hopper and said chambers, means for coupling said plates and said deflector, catches for locking said plates in closing position, sliding plates adapted to displace said catches, an arm pivotally mounted in said chambers and connected with said sliding plates, and screw conveyers mounted in said chambers and adapted to force the material thereagainst and to release thereby said catch controlling plates.

In testimony whereof I hereunto affix my signature.

JOSEPH J. WOJCIK.

Copies of this patent may be obtained for five cents each, by addressing the "Commissioner of Patents, Washington, D. C."